United States Patent
Song et al.

(10) Patent No.: US 7,116,373 B2
(45) Date of Patent: Oct. 3, 2006

(54) DEINTERLACING APPARATUS AND METHOD CAPABLE OF OUTPUTTING TWO CONSECUTIVE DEINTERLACED FRAMES

(75) Inventors: Suk-beom Song, Suwon (KR); Byeung-woo Jeon, Seongnam (KR)

(73) Assignee: Samsung Electronics, Co., Ltd., (KR)

( * ) Notice: Subject to any disclaimer, the term of this patent is extended or adjusted under 35 U.S.C. 154(b) by 493 days.

(21) Appl. No.: 10/705,450

(22) Filed: Nov. 10, 2003

(65) Prior Publication Data
US 2004/0135925 A1 Jul. 15, 2004

(30) Foreign Application Priority Data
Nov. 22, 2002 (KR) ............ 10-2002-0073052

(51) Int. Cl.
*H04N 11/20* (2006.01)
(52) U.S. Cl. .................... 348/452
(58) Field of Classification Search ............ 348/448, 348/452, 459, 556
See application file for complete search history.

(56) References Cited

U.S. PATENT DOCUMENTS

| | | | | |
|---|---|---|---|---|
| 5,617,147 A | * | 4/1997 | Ezaki | 348/461 |
| 5,963,268 A | * | 10/1999 | Ko | 348/556 |
| 6,084,639 A | * | 7/2000 | Fukuoka et al. | 348/556 |
| 6,385,245 B1 | * | 5/2002 | De Haan et al. | 375/240.16 |
| 6,456,329 B1 | * | 9/2002 | Tinker et al. | 348/448 |
| 6,822,691 B1 | * | 11/2004 | Kim et al. | 348/452 |
| 2004/0189865 A1 | * | 9/2004 | Chen et al. | 348/448 |

FOREIGN PATENT DOCUMENTS

| | | |
|---|---|---|
| EP | 0 948 201 | 9/2002 |
| JP | 2000-36944 | 2/2000 |

* cited by examiner

*Primary Examiner*—Paulos M. Natnael
(74) *Attorney, Agent, or Firm*—Mills & Onello LLP

(57) ABSTRACT

Deinterlacing apparatus and method capable of outputting two consecutive deinterlaced frames include a field buffer, a shift buffer, a frame generator, and a line exchanger. The field buffer receives and stores a plurality of consecutive interlaced fields, and then outputs, in response to a control signal, p-th interlaced line data of an m-th field, p-th interlaced line data of an (m+2)-th field, p-th interlaced line data of an (m+1)-th field, and (p+1)-th interlaced line data of the (m+1)-th field in series or the p-th interlaced line data of the (m+1)-th field, p-th interlaced line data of an (m+3)-th field, the p-th interlaced line data of the (m+2)-th field, and (p+1)-th interlaced line data of the (m+2)-th field in series. The shift buffer which receives signals output from the field buffer in series, converts the signals into parallel signals, and outputs first through fourth line data in parallel. The frame generator which receives the first through fourth line data from the shift buffer, senses motion in the first through fourth line data between fields, and selectively outputs the result of temporally filtering adjacent line data or the result of spatially filtering adjacent line data in response to the result of the motion sensing. The line exchanger receives the first line data of the shift buffer and an output signal of the frame generator and selectively exchanges the first line data with line data of the output signal of the frame generator in response to a line exchange signal.

9 Claims, 3 Drawing Sheets

DEINTERLACING APPARATUS AND METHOD CAPABLE OF OUTPUTTING TWO CONSECUTIVE DEINTERLACED FRAMES

BACKGROUND OF THE INVENTION

This application claims the priority of Korean Patent Application No. 2002-73052, filed on Nov. 22, 2002, in the Korean Intellectual Property Office, the disclosure of which is incorporated herein in its entirety by reference.

1. Field of the Invention

The present invention relates to image signal processing, and more particularly, to an deinterlacing apparatus and method capable of simultaneously outputting two deinterlaced frames using an input interlaced video signal.

2. Description of the Related Art

Various deinterlacing methods are utilized in contemporary signal processing systems, for example, using two field data, three field data, or four field data, by which an interlaced video signal is converted into a deinterlaced signal.

In general, conventional deinterlacing methods can be categorized according to two different methods, i.e., a deinterlacing method that utilizes a frame memory and a deinterlacing method that does not utilize a frame memory. T deinterlacing method that utilizes a frame memory can additionally sub-categorized depending on whether it adopts a motion-compensation method or a motion-adaptive method.

FIG. 1 is a diagram illustrating signals input into and output from a conventional deinterlacing apparatus. In other words, a deinterlacing apparatus 100 receives video signals IN, performs a predetermined process on the input video signals IN, and then outputs deinterlaced frames fo in series.

As shown in FIG. 1, the deinterlacing apparatus 100 receives an interlaced video signal IN and then outputs a deinterlaced frame fo. In most cases, when the additional processing of images using deinterlaced frame data is required, an additional memory is necessary. For example, a circuit for compensating for the response speed of an LCD monitor requires both previous frame data and current frame data in order to compensate for the response speed of the LCD monitor, and thus an additional frame buffer is necessary.

In other words, since many peripheral devices require current frame data and previous frame data to perform their functions and so are required to have an additional memory, a deinterlacing apparatus capable of outputting two consecutive deinterlaced frames at the same time is necessary.

SUMMARY OF THE INVENTION

The present invention provides a deinterlacing apparatus capable of outputting two consecutive deinterlaced frame signals at the same time.

The present invention also provides a deinterlacing method capable of outputting two consecutive deinterlaced frame signals at the same time.

According to an aspect of the present invention, there is provided a deinterlacing apparatus, including a field buffer, a shift buffer, a frame generator, and a line exchanger. The field buffer receives and stores a plurality of consecutive interlaced fields, and then outputs, in response to a control signal, p-th interlaced line data of an m-th field, p-th interlaced line data of an (m+2)-th field, p-th interlaced line data of an (m+1)-th field, and (p+1)-th interlaced line data of the (m+1)-th field in series or the p-th interlaced line data of the (m+1)-th field, p-th interlaced line data of an (m+3)-th field, the p-th interlaced line data of the (m+2)-th field, and (p+1)-th interlaced line data of the (m+2)-th field in series. The shift buffer receives signals output from the field buffer in series, converts the signals into parallel signals, and outputs first through fourth line data in parallel. The frame generator receives the first through fourth line data from the shift buffer, senses motion in the first through fourth line data between fields, and selectively outputs the result of temporally filtering adjacent line data or the result of spatially filtering adjacent line data in response to the result of the motion sensing. The line exchanger receives the first line data of the shift buffer and an output signal of the frame generator and selectively exchanges the first line data with line data of the output signal of the frame generator in response to a line exchange signal. Here, the first line data are comprised of line data of the (m+1)-th field and line data of the (m+2)-th field which are repeatedly output.

Preferably, the frame generator includes a motion sensor, a temporal filter, a spatial filter, and a selector. The motion sensor senses motion in the line data between fields based on the p-th interlaced line data of the m-th field and the p-th interlaced line data of the (m+2)-th field or motion in the p-th interlaced line data of the (m+1)-th field and the p-th line data of the (m+3)-th field and outputs the result of the motion sensing. The temporal filter receives the p-th interlaced line data of the m-th field and the p-th interlaced line data of the (m+2)-th field or the p-th interlaced line data of the (m+1)-th field and the p-th interlaced line data of the (m+3)-th field and outputs an average of the p-th interlaced line data of the m-th field and the p-th interlaced line data of the (m+2)-th field or an average of the p-th interlaced line data of the (m+1)-th field and the p-th interlaced line data of the (m+3)-th field. The spatial filter receives the p-th and (p+1)-th interlaced line data of the (m+1)-th field and outputs their average, or receives the p-th and (p+1)-th interlaced line data of the (m+2)-th field and outputs their average. The selector selectively outputs an output signal of the temporal filter or an output signal of the spatial filter in response to an output signal of the motion sensor.

Preferably, the line exchanger exchanges every odd-numbered or even-numbered line data of the first line data output signal with their corresponding line data of the output signal of the frame generator and then outputs the results of the exchange.

Preferably, the first data output signal is comprised of line data of the (m+1)-th field and line data of the (m+2)-th field which are alternately output.

According to another aspect of the present invention, there is provided a deinterlacing apparatus including a first storing unit, a second storing unit, a frame generator, and a line exchanger. The first storing unit receives an input signal and buffers the input signal on a field basis. The second storing unit includes first through fourth sub-memories receiving four line data, respectively, from an m-th field, an (m+1)-th field, an (m+2)-field, and an (m+3)-th field, respectively, stored in the first storing unit and sequentially storing the first through fourth line data. The frame generator senses motion in the first line data and the third line data stored in the second storing unit, performs temporal or spatial filtering on the first through fourth line data in response to the result of the motion sensing, and outputs the result of the temporal or spatial filtering. The line exchanger receives an output signal of the first sub-memory and an output signal of the frame generator, exchanges line data of the output signal of the first sub-memory with line data of the output signal of the frame generator in response to a predetermined line exchange signal, and simultaneously outputs two deinterlaced frames. Here, line data of the (m+1)-th field and line data of the (m+2)-th field are sequentially stored in the first sub-memory.

Preferably, the frame generator includes a motion sensor, a temporal filter, a spatial filter, and a selector. The motion sensor senses motion in line data between the m-th field and the (m+2)-th field or between the (m+1)-th field and the (m+3)-th field, based on an output signal of the first sub-memory and an output signal of the third sub-memory, and outputs the result of the motion sensing. The temporal filter receives and temporally filters the output signals of the first and third sub-memories, and outputs the result of the temporal filtering. The spatial filter receives and spatially filters the output signals of the second sub-memory and the fourth sub-memory, and outputs the result of the spatial filtering. The selector receives an output signal of the temporal filter and an output signal of the spatial filter and selectively outputs one of the output signal of the temporal filter and the output signal of the spatial filter in response to an output signal of the motion sensor.

Preferably, the line exchanger exchanges every odd-numbered or even-numbered line data of the first line data output signal with their corresponding line data of the output signal of the frame generator and then outputs the results of the exchange.

According to still another aspect of the present invention, there is provided a deinterlacing method. The deinterlacing method involves (a) receiving and storing a plurality of consecutive interlaced fields, and then outputting, in response to a control signal, p-th interlaced line data of an m-th field, p-th interlaced line data of an (m+2)-th field, p-th interlaced line data of an (m+1)-th field, and (p+1)-th interlaced line data of the (m+1)-th field in series or the p-th interlaced line data of the (m+1)-th field, p-th interlaced line data of an (m+3)-th field, the p-th interlaced line data of the (m+2)-th field, and (p+1)-th interlaced line data of the (m+2)-th field in series, (b) receiving signals output in step (a) in series, converting the signals into parallel signals, and then outputting first through fourth line data in parallel, (c) receiving the first through fourth line data output in step (b), sensing motion in the first through fourth line data between fields, and selectively outputting the result of temporally filtering adjacent line data or the result of spatially filtering adjacent line data in response to the result of the motion sensing, and (d) receiving the first line data and a signal output in step (c) and selectively exchanging the first line data with line data of the signal output in step (c) in response to a predetermined line exchange signal. Here, the first line data are comprised of line data of the (m+1)-th field and line data of the (m+2)-th field which are repeatedly output, and in step (d), every odd-numbered or even-numbered line data of the first line data output signal are exchanged with their corresponding line data of the signal output in step (c) and then the results of the exchange are output.

Preferably, step (c) includes (c1) sensing motion in the p-th interlaced line data of the m-th field and the p-th interlaced line data of the (m+2)-th field or motion in the p-th interlaced line data of the (m+1)-th field and the p-th line data of the (m+3)-th field and outputting the result of the motion sensing, (c2) receiving the p-th interlaced line data of the m-th field and the p-th interlaced line data of the (m+2)-th field or the p-th interlaced line data of the (m+1)-th field and the p-th interlaced line data of the (m+3)-th field and outputting an average of the p-th interlaced line data of the m-th field and the p-th interlaced line data of the (m+2)-th field or an average of the p-th interlaced line data of the (m+1)-th field and the p-th interlaced line data of the (m+3)-th field, (c3) receiving the p-th and (p+1)-th interlaced line data of the (m+1)-th field and outputting their average, or receiving the p-th and (p+1)-th interlaced line data of the (m+2)-th field and outputting their average, and (c4) selectively outputting a signal output in step (c2) or a signal output in step (c3) in response to the result of the motion sensing.

BRIEF DESCRIPTION OF THE DRAWINGS

The above features and advantages of the present invention will become more apparent by describing in detail exemplary embodiments thereof with reference to the attached drawings in which.

DETAILED DESCRIPTION OF PREFERRED EMBODIMENTS

Figure 1:
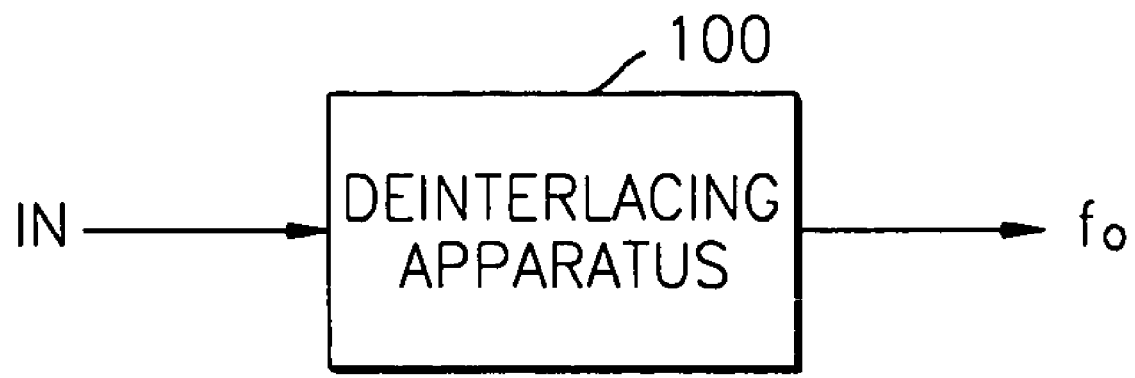
FIG. 1 is a block diagram illustrating signals input into and output from a conventional deinterlacing apparatus.

The present invention will be described more fully with reference to the accompanying drawings, in which preferred embodiments of the invention are shown. Through the drawings, the same reference numerals are used to represent the same elements.

Figure 2:
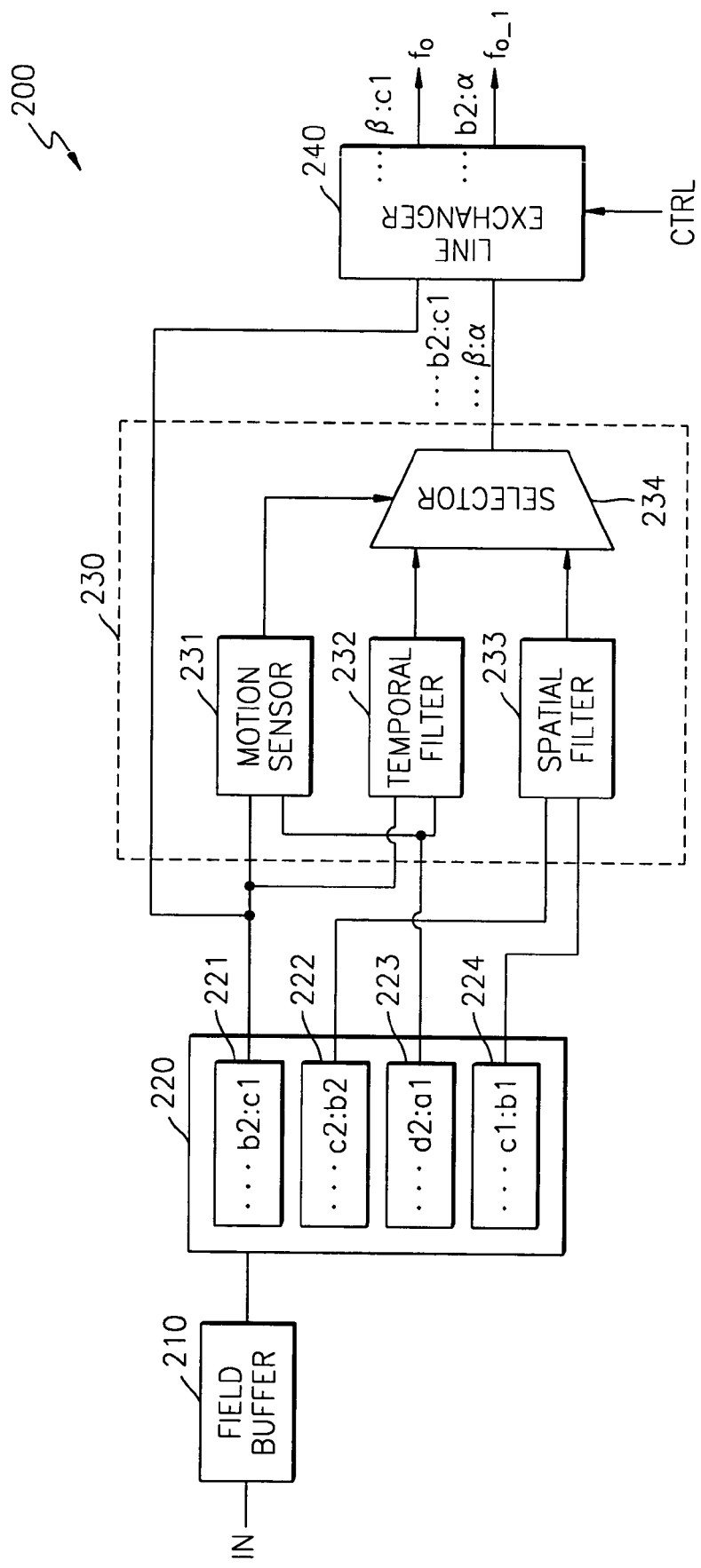
FIG. 2 is a block diagram of a deinterlacing apparatus according to a preferred embodiment of the present invention.

FIG. 2 is a block diagram of a deinterlacing apparatus according to a preferred embodiment of the present invention. Referring to FIG. 2, a deinterlacing apparatus 200 includes a field buffer 210, a shift buffer 220, a frame generator 230, and a line exchanger 240.

The field buffer 210 receives and buffers four interlaced fields IN. Thereafter, the field buffer 210 outputs p-th line data of a first interlaced field, p-th line data of a third interlaced field, and p-th line data and (p+1)-th line data of a second interlaced field in series. In alternative embodiments, other sequences are possible, for example, the field buffer 210 may output the p-th line data of the second interlaced field, p-th line data of a fourth interlaced field, and the p-th line data and (p+1)-th line data of the third interlaced field in series. The sequence of such line data to be output is determined by a predetermined control signal (not shown) controlling the field buffer 210.

The shift buffer 220 receives line data output from the field buffer 210 in series, converts the line data into parallel line data, and outputs first through fourth line data in parallel. As shown in FIG. 2, the shift buffer 220 includes four sub-memories 221, 222, 223, and 224, and four line data are stored in the corresponding sub-memories 221, 222, 223, and 224.

The frame generator 230 includes a motion sensor 231, a temporal filter 232, a spatial filter 233, and a selector 234. The frame generator 230 generates a deinterlaced frame using four line data output in parallel by the shift buffer 220. The generation of a deinterlaced frame is performed by each unit constituting the frame generator 230.

The motion sensor 231 senses motion in the line data between fields and outputs the results of the motion sensing. Here, motion in the line data refers to variations in the line data caused by image shifts between fields. The motion sensor 231 is connected to an output signal of the first sub-memory 221 and an output signal of the third sub-memory 223 and outputs the results of the motion sensing to the selector 234.

When deinterlacing an interlaced field, the temporal filter 232 and the spatial filter 233 perform interpolation, i.e., estimate data based on averages of line data that are supposed to be surrounding the data to be estimated.

The temporal filter 232 receives the output signal of the first sub-memory 221 and the output signal of the third sub-memory 223 and outputs the result of temporally filtering the output signals of the first and third sub-memories 221 and 223 to the selector 234. A temporal filtering operation is performed, for example by outputting a temporal average signal of two input signals.

The spatial filter 233 receives an output signal of the second sub-memory 222 and an output signal of the fourth sub-memory 224, and outputs the result of spatially filtering the output signals of the second sub-memory 222 and the fourth sub-memory 224 to the selector 234. A spatial filtering operation is performed, for example by outputting a spatial average signal of two input signals.

In the case of deinterlacing an odd frame, newly interpolated line data are determined by the temporal average (temporal filtering) of line data in even frames neighboring the odd frame or by the spatial average (spatial filtering) of line data in the odd frame.

The selector 234 selectively outputs an output signal of the temporal filter 232 or an output signal of the spatial filter 233 in response to an output signal of the motion sensor 231. The output signal of the selector 234 constitutes a portion of the deinterlaced frame data.

Figure 3:
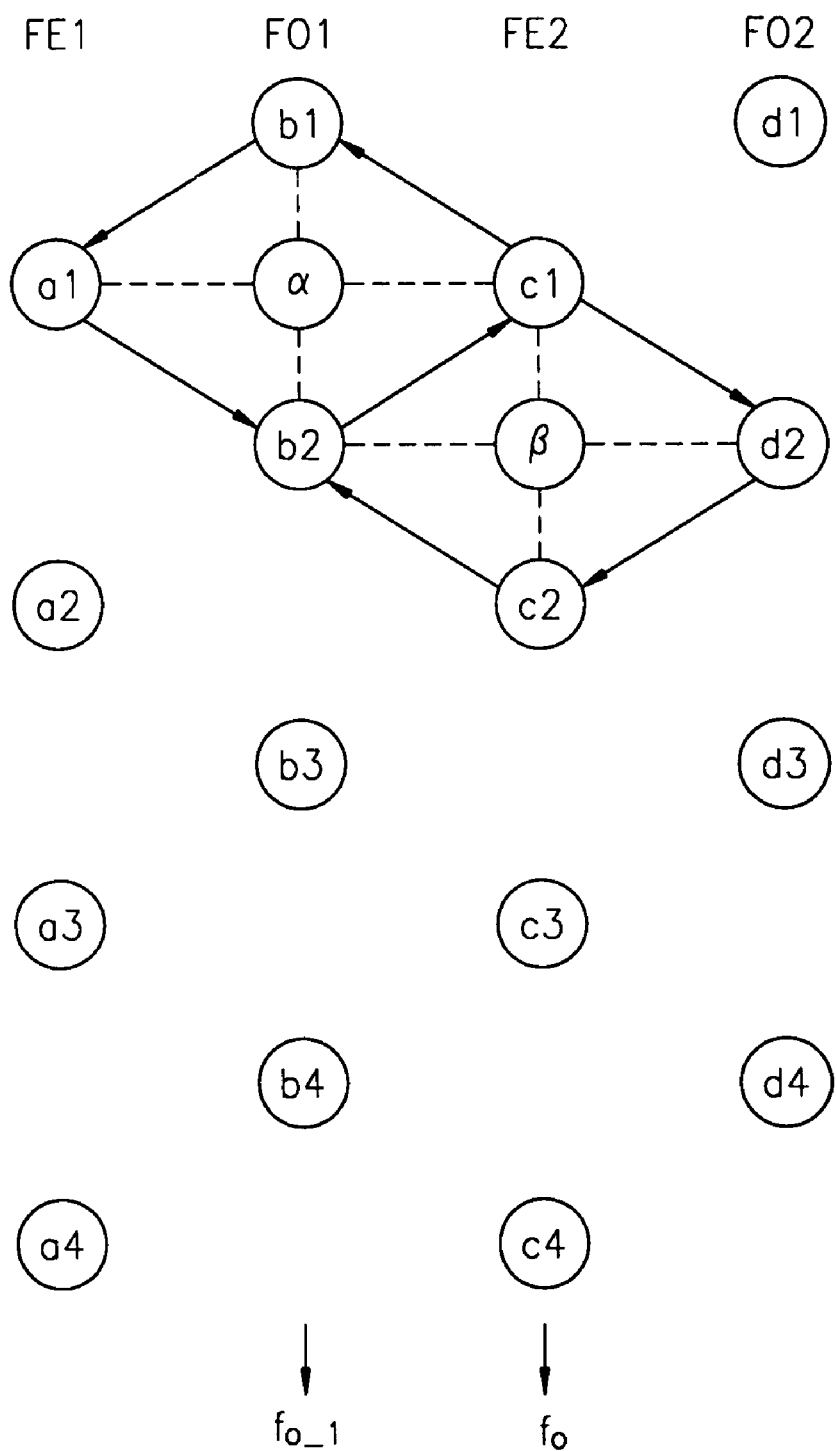
FIG. 3 is a diagram illustrating a method of generating two deinterlaced frames using consecutive field data according to a preferred embodiment of the present invention.

The line exchanger 240 selectively exchanges a portion of the output signal of the selector 234 with a portion of the output signal of the first sub-memory 221 of the shift buffer 220 in response to a line exchange signal CTRL and then outputs the exchanged signals. In this embodiment, the output signals of the line exchanger 240 are a first deinterlaced frame fo-1 and a second deinterlaced frame fo. FIG. 3 is a diagram illustrating a method of generating two deinterlaced frames using consecutive field data according to a preferred embodiment of the present invention. In FIG. 3, two deinterlaced frames are generated using four different interlaced fields FE1, FO1, FE2, and FO2. A first even interlaced field FE1 includes a plurality of line data a1, a2, a3, and a4, and a first odd interlaced field FE1 includes a plurality of line data b1, b2, b3, and b4. A second even interlaced field FE2 includes a plurality of line data c1, c2, c3, and c4, and a second odd interlaced field FO2 includes a plurality of line data d1, d2, d3, and d4.

The operation of the deinterlacing apparatus 200 according to the present invention will be described more fully with reference to FIGS. 2 and 3. Referring to FIGS. 2 and 3, the field buffer 210 receives and buffers four interlaced fields, for example, the first even interlaced field FE1, the first odd interlaced field FO1, the second even interlaced field FE2, and the second odd interlaced field FO2, and the shift buffer 220 receives four line data from the field buffer 210 and buffers the four line data in their corresponding sub-memories.

In the present embodiment, a method of generating a deinterlaced frame using three interlaced fields is adopted. Referring to FIG. 3, the first even interlaced field FE1, the first odd interlaced field FO1, and the second even interlaced field FE2 are used to generate the first deinterlaced frame fo_1, and the first odd interlaced field FO1, the second even interlaced field FE2, and the second odd interlaced field FO2 are used to generate the second deinterlaced frame fo. In FIG. 3, the first deinterlaced frame fo_1 is generated in the first odd interlaced field FO1, and the second deinterlaced frame fo is generated in the second even interlaced field FE2.

The shift buffer 220 reads four line data in order to generate interpolated data of the first deinterlaced frame fo_1. In FIG. 3, the line data b1, a1, b2, and c1 are read and then are buffered in the four sub-memories 221, 222, 223, and 224, as shown in FIG. 2.

The frame generator 230 interpolates line data a between the line data b1 and b2 of the first odd interlaced field FO1 using the four line data b1, a1, b2, and c1 read by the shift buffer 220. The interploated line data $\alpha$ can be obtained by the motion sensor 231, the temporal filter 232, and the spatial filter 233 shown in FIG. 2. The interpolated line data $\alpha$ are the result of performing temporal filtering on the line data a1 and c1, i.e., an average of the line data a1 and c1, or the result of performing spatial filtering on the line data b1 and b2, i.e., an average of the line data b1 and b2.

Whether the result of the temporal filtering or the result of the spatial filtering is determined as $\alpha$ is determined by an output signal of the motion sensor 231. The motion sensor 231 senses and outputs the motion in line data in the two interlaced fields at either side of the first odd interlaced field FO1, for example, the motion of the line data a1 and c1 in FIG. 3. If the line data a1 and c1 are believed to have moved based upon an output signal of the spatial filter 233, the result of the temporal filtering is determined as $\alpha$.

The output signal $\alpha$ of the frame generator 230 is input into the line exchanger 240. The line exchanger 240 receives the output signal a of the frame generator 230 and an output signal of the first sub-memory 221 of the shift buffer 220. In other words, referring to FIGS. 2 and 3, c1 and $\alpha$ are input into the line exchanger 240 at the same time.

Thereafter, in order to generate the second deinterlaced frame fo in the second even interlaced field FE2, the shift buffer 220 reads four line data, for example, line data c1, d2, c2, and b2 shown in FIG. 3, and then buffers the four line data in their corresponding sub-memories 221, 222, 223, and 224.

The frame generator 230 interpolates line data $\beta$ between the line data c1 and c2 of the second even interlaced field FE2 using the line data c1, d2, c2, and b2 read by the shift buffer 220. The interpolated line data $\beta$ can be obtained by the motion sensor 231, the temporal filter 232, and the spatial filter 233 shown in FIG. 2. The process of obtaining the interpolated line data $\beta$ is similar to the process of obtaining the interpolated line data $\alpha$, and thus its description will not be repeated here.

The output signal $\beta$ of the frame generator 230 is input into the line exchanger 240. The line exchanger 240 receives the output signal $\beta$ of the frame generator 230 and an output signal of the first sub-memory 221 of the shift buffer 220. In other words, referring to FIGS. 2 and 3, b2 and $\beta$ are input into the line exchanger 240 at the same time.

The line exchanger 240 sequentially receives the interpolated line data $\alpha$ and $\beta$ and the output signals c1 and b2 of the first sub-memory 221. The interpolated line data $\alpha$ and $\beta$ and the output signals c1 and b2 of the first sub-memory 221 constitute the first deinterlaced frame fo_1 and the second deinterlaced frame fo, and the deinterlacing apparatus 200 shown in FIG. 2 outputs the two deinterlaced frames fo_1 and fo, for example, at the same time.

Signals input into the line exchanger 240, i.e., every even-numbered or odd-numbered line data of the output signal of the frame generator 230, are exchanged with their corresponding line data of the output signal of the first sub memory 221. In other words, a first output port and a second output port output the first deinterlaced frame fo_1 and the second deinterlaced frame fo, respectively, and then the first and second deinterlaced frames fo_1 and fo exchange their output ports so that the first output port and the second output port output the second deinterlaced frame fo and the first deinterlaced frame fo_1, respectively.

In other words, the line data of the first deinterlaced frame fo_1 and the line data of the second deinterlaced frame fo can be transformed into suitable image data through line alternation. Here, the line exchanger 240 exchanges the locations of signals input thereinto in response to the line exchange signal CTRL and then outputs the signals having their locations exchanged.

Here, the line exchanger 240 preferably exchanges every even-numbered or odd-numbered line data of a signal with their corresponding line data of another signal in response to a control signal. Accordingly, as shown in FIG. 2, line data of the first deinterlaced frame fo_1 are output in an order of $\alpha$, b2, . . . , and line data of the second deinterlaced frame fo are output in an order of c1, $\beta$, . . . .

In short, according to the present invention, the first deinterlaced frame fo_1 and the second deinterlaced frame fo are simultaneously output using a plurality of interlaced fields.

While the present invention has been particularly shown and described with reference to exemplary embodiments thereof, it will be understood by those of ordinary skill in the art that various changes in form and details may be made therein without departing from the spirit and scope of the present invention as defined by the following claims.

As described above, the deinterlacing apparatus and method according to the present invention receive a plurality of interlaced fields and output two consecutive deinterlaced frames at the same time.

What is claimed is:

1. A deinterlacing apparatus comprising:
   a field buffer which receives and stores a plurality of consecutive interlaced fields, and then outputs, in response to a control signal, p-th interlaced line data of an m-th field, p-th interlaced line data of an (m+2)-th field, p-th interlaced line data of an (m+1)-th field, and (p+1)-th interlaced line data of the (m+1)-th field in series or the p-th interlaced line data of the (m+1)-th field, p-th interlaced line data of an (m+3)-th field, the p-th interlaced line data of the (m+2)-th field, and (p+1)-th interlaced line data of the (m+2)-th field in series;
   a shift buffer which receives signals output from the field buffer in series, converts the signals into parallel signals, and outputs first through fourth line data in parallel;
   a frame generator which receives the first through fourth line data from the shift buffer, senses motion between fields of the first through fourth line data between fields, and selectively outputs, as an output signal, a first result of temporally filtering adjacent line data or a second result of spatially filtering adjacent line data in response to the result of the motion sensing; and
   a line exchanger which receives the first line data of the shift buffer and the output signal of the frame generator and selectively exchanges the first line data with line data of the output signal of the frame generator in response to a line exchange signal,
   wherein the first line data are comprised of line data of the (m+1)-th field and line data of the (m+2)-th field which are repeatedly output.

2. The deinterlacing apparatus of claim 1, wherein the frame generator comprises:
   a motion sensor which senses motion in the line data between fields based on the p-th interlaced line data of the m-th field and the p-th interlaced line data of the (m+2)-th field or motion in the p-th interlaced line data of the (m+1)-th field and the p-th line data of the (m+3)-th field and outputs, as an output signal, the result of the motion sensing;
   a temporal filter which receives the p-th interlaced line data of the m-th field and the p-th interlaced line data of the (m+2)-th field or the p-th interlaced line data of the m+1)-th field and the p-th interlaced line data of the (m+3)-th field and outputs an average of the p-th interlaced line data of the m-th field and the p-th interlaced line data of the (m+2)-th field or an average of the p-th interlaced line data of the (m+1)-th field and the p-th interlaced line data of the (m+3)-th field;
   a spatial filter which receives the p-th and (p+1)-th interlaced line data of the (m+1)-th field and outputs their average, or receives the p-th and (p+1)-th interlaced line data of the (m+2)-th field and outputs their average; and
   a selector which selectively outputs the output signal of the temporal filter or the output signal of the spatial filter in response to the output signal of the motion sensor.

3. The deinterlacing apparatus of claim 1, wherein the line exchanger exchanges every odd-numbered or even-numbered line data of the first line data output signal with their corresponding line data of the output signal of the frame generator and then outputs the results of the exchange.

4. The deinterlacing apparatus of claim 1, wherein the first data output signal is comprised of line data of the (m+1)-th field and line data of the (m+2)-th field which are alternately output.

5. A deinterlacing apparatus comprising:
   a first storing unit which receives an input signal and buffers the input signal on a field basis;
   a second storing unit which includes first through fourth sub-memories receiving four line data, respectively, from an m-th field, an (m+1)-th field, an (m+2)-field, and an (m+3)-th field, respectively, stored in the first storing unit and sequentially storing the first through fourth line data;
   a frame generator which senses motion in the first line data and the third line data stored in the second storing unit, performs temporal or spatial filtering on the first through fourth line data in response to the result of the motion sensing, and outputs the result of the temporal or spatial filtering; and
   a line exchanger which receives an output signal of the first sub-memory and an output signal of the frame generator, exchanges line data of the output signal of the first sub-memory with line data of the output signal of the frame generator in response to a predetermined line exchange signal, and simultaneously outputs two deinterlaced frames,
   wherein line data of the (m+1)-th field and line data of the (m+2)-th field are sequentially stored in the first sub-memory.

6. The deinterlacing apparatus of claim 5, wherein the frame generator comprises:
   a motion sensor which senses motion in the line data between the m-th field and the (m+2)-th field or between the (m+1)-th field and the (m+3)-th field, based on an output signal of the first sub-memory and an output signal of the third sub-memory, and outputs the result of the motion sensing;

a temporal filter which receives and temporally filters the output signals of the first and third sub-memories, and outputs the result of the temporal filtering;

a spatial filter which receives and spatially filters the output signals of the second sub-memory and the fourth sub-memory, and outputs the result of the spatial filtering; and a selector which receives an output signal of the temporal filter and an output signal of the spatial filter and selectively outputs one of the output signal of the temporal filter and the output signal of the spatial filter in response to an output signal of the motion sensor.

7. The deinterlacing apparatus of claim 5, wherein the line exchanger exchanges every odd-numbered or even-numbered line-data of the first line data output signal with their corresponding line data of the output signal of the frame generator and then outputs the results of the exchange.

8. A deinterlacing method comprising:
(a) receiving and storing a plurality of consecutive interlaced fields, and then outputting, in response to a control signal, p-th interlaced line data of an m-th field, p-th interlaced line data of an (m+2)-th field, p-th interlaced line data of an (m+1)-th field, and (p+1)-th interlaced line data of the (m+1)-th field in series or the p-th interlaced line data of the (m+1)-th field, p-th interlaced line data of an (m+3)-th field, the p-th interlaced line data of the (m+2)-th field, and (p+1)-th interlaced line data of the (m+2)-th field in series;
(b) receiving signals output in step (a) in series, converting the signals into parallel signals, and outputting first through fourth line data in parallel;
(c) receiving the first through fourth line data output in step (b), sensing motion between fields in the first through fourth line data, and selectively outputting, as an output signal, a result of temporally filtering adjacent line data or a result of spatially filtering adjacent line data in response to the result of the motion sensing; and (d) receiving the first line data and a signal output in step (c) and selectively exchanging the first line data with line data of the signal output in step (c) in response to a predetermined line exchange signal, wherein the first line data are comprised of line data of the (m+1)-th field and line data of the (m+2)-th field which are repeatedly output, and in step (d), every odd-numbered or even-numbered line data of the first line data output signal are exchanged with their corresponding line data of the signal output in step (c) and then the results of the exchange are output.

9. The deinterlacing method of claim 8, wherein step (c) comprises:
(c1) sensing motion in the p-th interlaced line data of the m-th field and the p-th interlaced line data of the (m+2)-th field or motion in the p-th interlaced line data of the (m+1)-th field and the p-th line data of the (m+3)-th field and outputting the result of the motion sensing;
(c2) receiving the p-th interlaced line data of the m-th field and the p-th interlaced line data of the (m+2)-th field or the p-th interlaced line data of the (m+1)-th field and the p-th interlaced line data of the (m+3)-th field and outputting an average of the p-th interlaced line data of the m-th field and the p-th interlaced line data of the (m+2)-th field or an average of the p-th interlaced line data of the (m+1)-th field and the p-th interlaced line data of the (m+3)-th field;
(c3) receiving the p-th and (p+1)-th interlaced line data of the (m+1)-th field and outputting their average, or receiving the p-th and (p+1)-th interlaced line data of the (m+2)-th field and outputting their average; and
(c4) selectively outputting a signal output in step (c2) or a signal output in step (c3) in response to the result of the motion sensing.

* * * * *